US008196412B2

(12) United States Patent
Jorgensen

(10) Patent No.: US 8,196,412 B2
(45) Date of Patent: Jun. 12, 2012

(54) GAS TURBINE TRANSITION DUCT PROFILE

(75) Inventor: Stephen W. Jorgensen, Palm City, FL (US)

(73) Assignee: Alstom Technology Ltd, Baden (CH)

( * ) Notice: Subject to any disclaimer, the term of this patent is extended or adjusted under 35 U.S.C. 154(b) by 505 days.

(21) Appl. No.: 12/558,131

(22) Filed: Sep. 11, 2009

(65) Prior Publication Data

US 2011/0061393 A1 Mar. 17, 2011

(51) Int. Cl.
*F02C 1/00* (2006.01)

(52) U.S. Cl. ........................................................ 60/752

(58) Field of Classification Search ................. 60/39.37, 60/752–760
See application file for complete search history.

(56) References Cited

U.S. PATENT DOCUMENTS

| | | | | |
|---|---|---|---|---|
| 5,983,641 | A * | 11/1999 | Mandai et al. | 60/722 |
| 6,644,032 | B1 * | 11/2003 | Resos et al. | 60/752 |
| 7,373,772 | B2 * | 5/2008 | Simons et al. | 60/39.37 |
| 7,677,045 | B2 * | 3/2010 | Jorgensen et al. | 60/752 |
| 7,810,334 | B2 * | 10/2010 | Hsu et al. | 60/752 |
| 2006/0069533 | A1 * | 3/2006 | Florea et al. | 703/1 |
| 2007/0240422 | A1 | 10/2007 | Jorgensen | |
| 2010/0018211 | A1 * | 1/2010 | Venkataraman et al. | 60/754 |

* cited by examiner

*Primary Examiner* — Louis Casaregola
*Assistant Examiner* — Phutthiwat Wongwian
(74) *Attorney, Agent, or Firm* — Shook, Hardy & Bacon L.L.P.

(57) ABSTRACT

A transition duct having a panel assembly with an inlet end of generally circular cross section and an outlet end having a generally rectangular arc-like cross section is disclosed. The panel assembly has an uncoated internal profile substantially in accordance with coordinate values X, Y, and Z as set forth in Table 1. The coordinates are taken at a sweep angle Θ wherein Θ is an angle measured from the inlet end and X, Y, and Z are coordinates define the panel assembly profile at each angle Θ. An alternate embodiment of the invention defines an envelope for the uncoated internal profile of the panel assembly.

18 Claims, 8 Drawing Sheets

Fig. 1 – Prior Art

Fig. 2 – Prior Art

GAS TURBINE TRANSITION DUCT PROFILE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to a transition duct for a gas turbine engine, specifically to a novel and improved profile for a transition duct that results in lower operating stresses and extended component life.

In a typical can annular gas turbine engine, a plurality of combustors are arranged in a generally annular array about the engine. The combustors receive pressurized air from the engine's compressor, adds fuel to create a fuel/air mixture, and combusts that mixture to produce hot gases. The hot gases exiting the combustors are utilized to turn a turbine, which is coupled to a shaft that drives a generator for generating electricity.

The hot gases are transferred from the combustor to the turbine by a transition duct. Due to the position of the combustors relative to the turbine inlet, the transition duct must change cross-sectional shape from a generally cylindrical shape at the combustor exit to a generally rectangular arc-like shape at the turbine inlet. In addition, the transition duct undergoes a change in radial position, since the combustors are typically mounted outboard of the turbine. Extreme care must be taken with respect to the design of these ducts in order to avoid sharp geometric changes, otherwise regions of high stress and stress concentrations can occur. The combination of complex geometry changes as well as extreme mechanical and thermal loading seen by the transition duct can create a harsh operating environment that can lead to premature deterioration, requiring repair and replacement of the transition ducts. To withstand the hot temperatures from the combustor gases, transition ducts are cooled or a surface coating is applied to the transition duct. A variety of methods are available to provide cooling such as through internal channels, impingement cooling, or effusion cooling.

Severe cracking, resulting in component failure and forcing engine shutdown, has been known to occur in transition ducts having extremely sharp geometry changes and internal air-cooled channels. In such an incident, the engine requires transition duct replacement or repair prior to returning to operational status. The present invention seeks to overcome the shortfalls of these prior art designs.

SUMMARY

The present invention is defined by the claims below. Embodiments of the present invention solve at least the above problems by providing a transition duct having a geometric profile that results in lower operating stresses and improved component life while coupled to a low emissions combustor.

In an aspect of the present invention, a transition duct is provided having an inlet ring, an aft frame, and a panel assembly having an internal profile defined by a series of X, Y, and Z Cartesian coordinates taken along a sweep angle Θ that extends from the inlet to the outlet of the transition duct.

A novel and improved transition duct having an enhanced profile for improved performance and durability is provided. The internal flowpath geometry of the transition duct has been configured to remove areas of sharp geometric change. The sharp geometric changes, in combination with high thermal and mechanical loading, caused regions of high steady and vibratory stresses and local stress concentrations in prior art ducts that often lead to cracking and premature failure. Furthermore, due to a rounder profile, certain natural frequencies of the transition duct are raised to avoid potential vibratory issues.

A variety of cooling methods can be used in combination with the enhanced profile of the present invention transition duct. In an embodiment, a plurality of cooling holes are located in the walls of the transition duct for directing a cooling fluid, such as air, through the holes. The cooling holes are located in the panel assembly and are oriented at an angle relative to the panel assembly surface.

In an embodiment of the present invention, there is provided a transition duct with a panel assembly having an inlet end of generally circular cross section and an outlet end having a generally rectangular arc-like cross section with an uncoated internal profile substantially in accordance with the coordinate values Θ, X, Y, and Z as set forth in Table 1. The origin of the coordinate system is positioned at the center of the panel assembly inlet end along a centerline axis. It will be appreciated that the coordinate values given are for manufacturing purposes, in a room temperature condition. The coordinate values X, Y, and Z in Table 1 are standard Cartesian coordinates, and correspond to a specific sweep angle Θ, which together, define a cross section of the panel assembly. Each cross section is joined smoothly with adjacent cross sections to define a panel assembly for the transition duct. It will also be appreciated that as the transition duct transfers hot combustion gases from a combustor to the turbine inlet, the transition duct absorbs heat, and therefore the coordinates provided in Table 1 do not necessarily correspond to the panel assembly position when in operation at an elevated temperature.

In an alternate embodiment, there is provided a transition duct with a panel assembly having an inlet end of generally circular cross section and outlet end having a generally rectangular arc-like cross section with an uncoated internal profile within an envelope of +/−0.250 inches in a direction normal to any surface of the panel assembly substantially in accordance with the coordinate values Θ, X, Y, and Z as set forth in Table 1. The origin of the Cartesian coordinate system is positioned at the center of the panel assembly inlet end along a centerline axis. A distance of +/−0.250 inches in a direction normal to any surface location along the panel assembly defines an envelope for this particular panel assembly and ensures that manufacturing tolerances are accommodated within the envelope of the panel assembly. As with the embodiment previously disclosed, it will be appreciated that the coordinate values given are for manufacturing purposes, in a room temperature condition. Each set of coordinate values X, Y, and Z in Table 1 is in standard Cartesian coordinates and corresponds to a specific sweep angle Θ, which, when taken together defines a cross section of the panel assembly. Each cross section is joined smoothly with adjacent cross sections to define a panel assembly for the transition duct. It will also be appreciated that as the transition duct transfers hot combustion gases from a combustor to the turbine inlet, the transition duct heats up and therefore the Cartesian coordinates for a given Θ value provided in Table 1 may not necessarily correspond to the panel assembly position when in operation at an elevated temperature.

The instant invention will now be described with particular reference to the accompanying drawings.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Embodiments of the present invention provide apparatus for a gas turbine transition duct that are configured geometrically to have lower operating stresses. Lower stresses, both mechanical and thermal result in improved component life.

Figure 1:
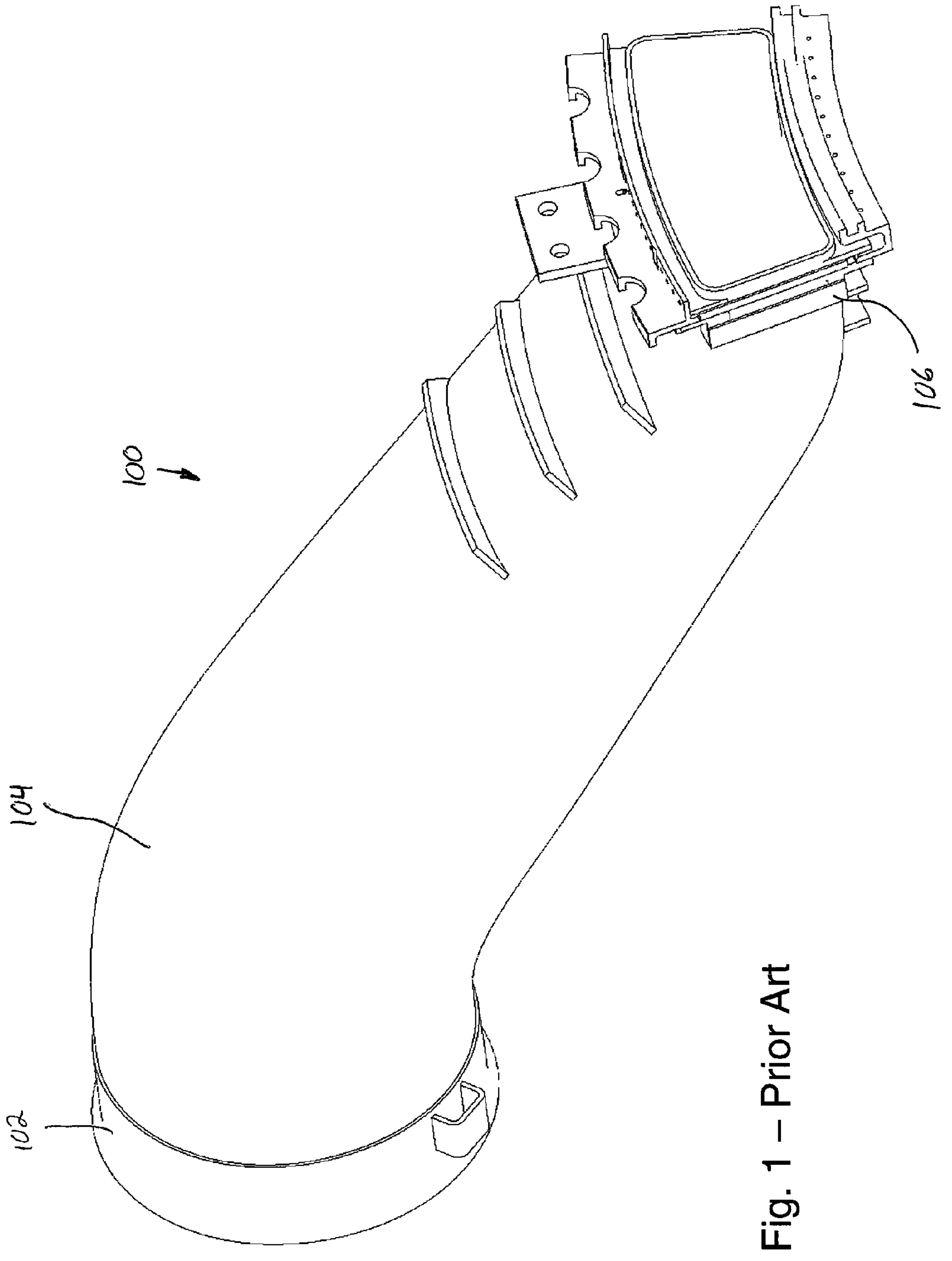
FIG. 1 is a perspective view of a transition duct of the prior art.
Figure 2:
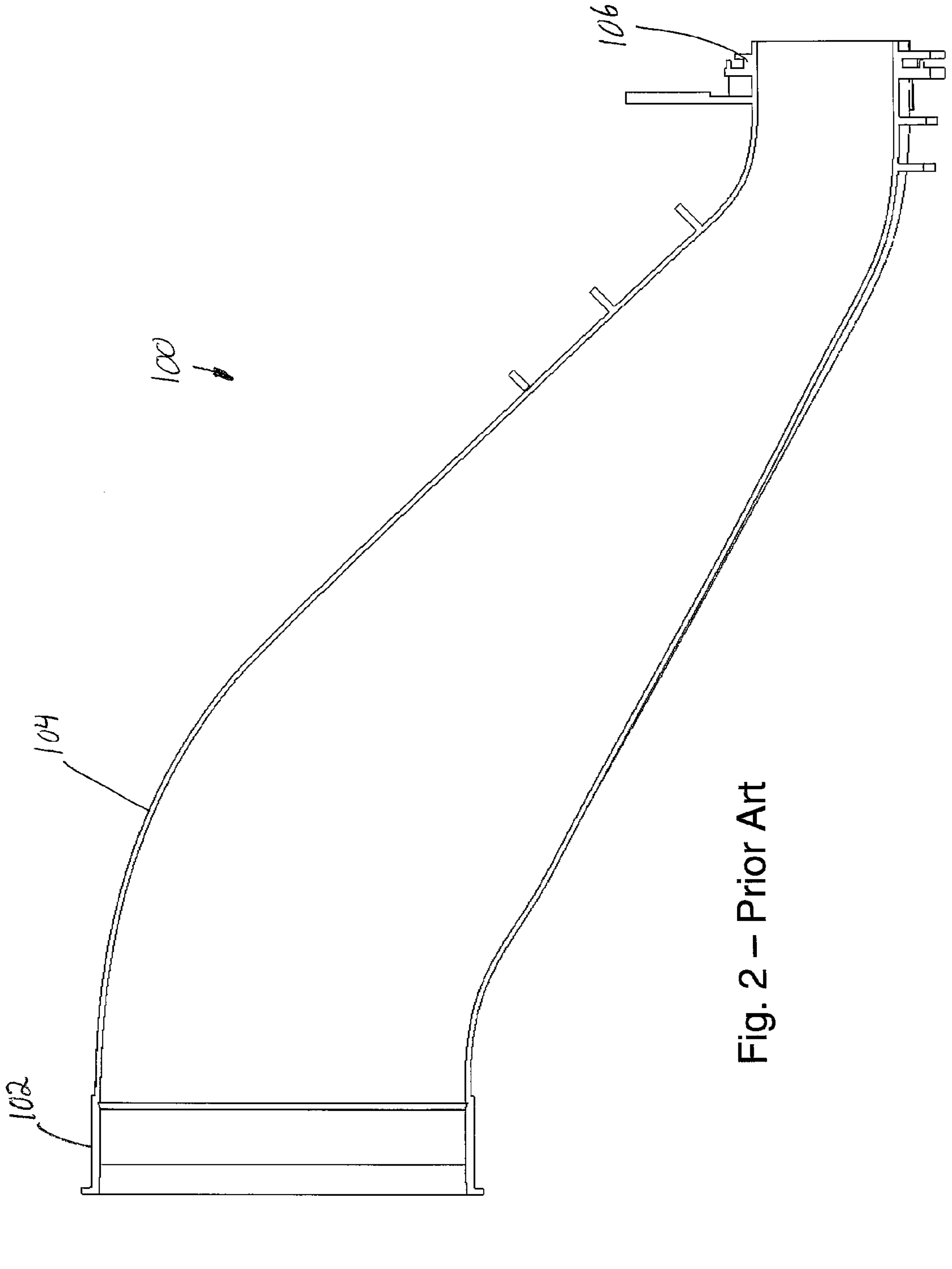
FIG. 2 is a cross section view of the prior art transition duct of FIG. 1.

Referring initially to FIGS. 1 and 2, a transition duct 100 of the prior art is shown. The transition duct 100 includes an inlet ring 102, a panel assembly 104, and an aft frame 106. The inlet ring 102 is of generally circular cross section, while the aft frame 106 is of generally rectangular arc-like cross section where the generally rectangular arc-like shape is defined by a pair of concentric arcs of different diameters connected by a pair of radial lines. The transition duct 100, which is used to transfer hot combustion gases from a combustor to a turbine, has geometric profile that must transition from a generally circular cross section to that of a generally arc-like cross section at the turbine inlet as well as to change radial positions. The geometric profile of the transition duct 100 contains a sharp transition from circular to rectangular arc-like over a short axial and radial distance thereby resulting in high stress regions throughout the aft end of the transition duct 100.

Figure 3:
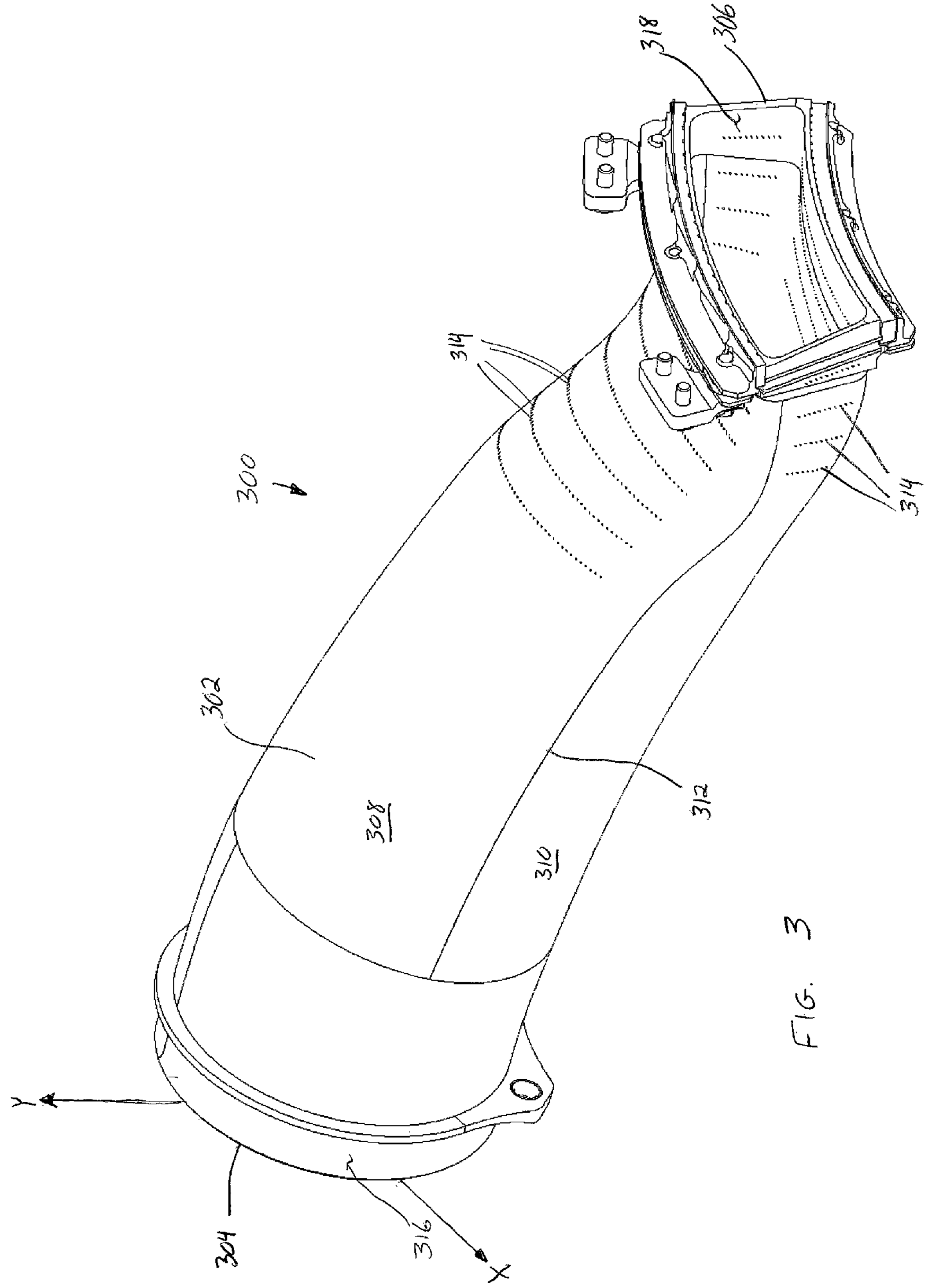
FIG. 3 is a perspective view of a transition duct in accordance with an embodiment of the present invention.
Figure 4:
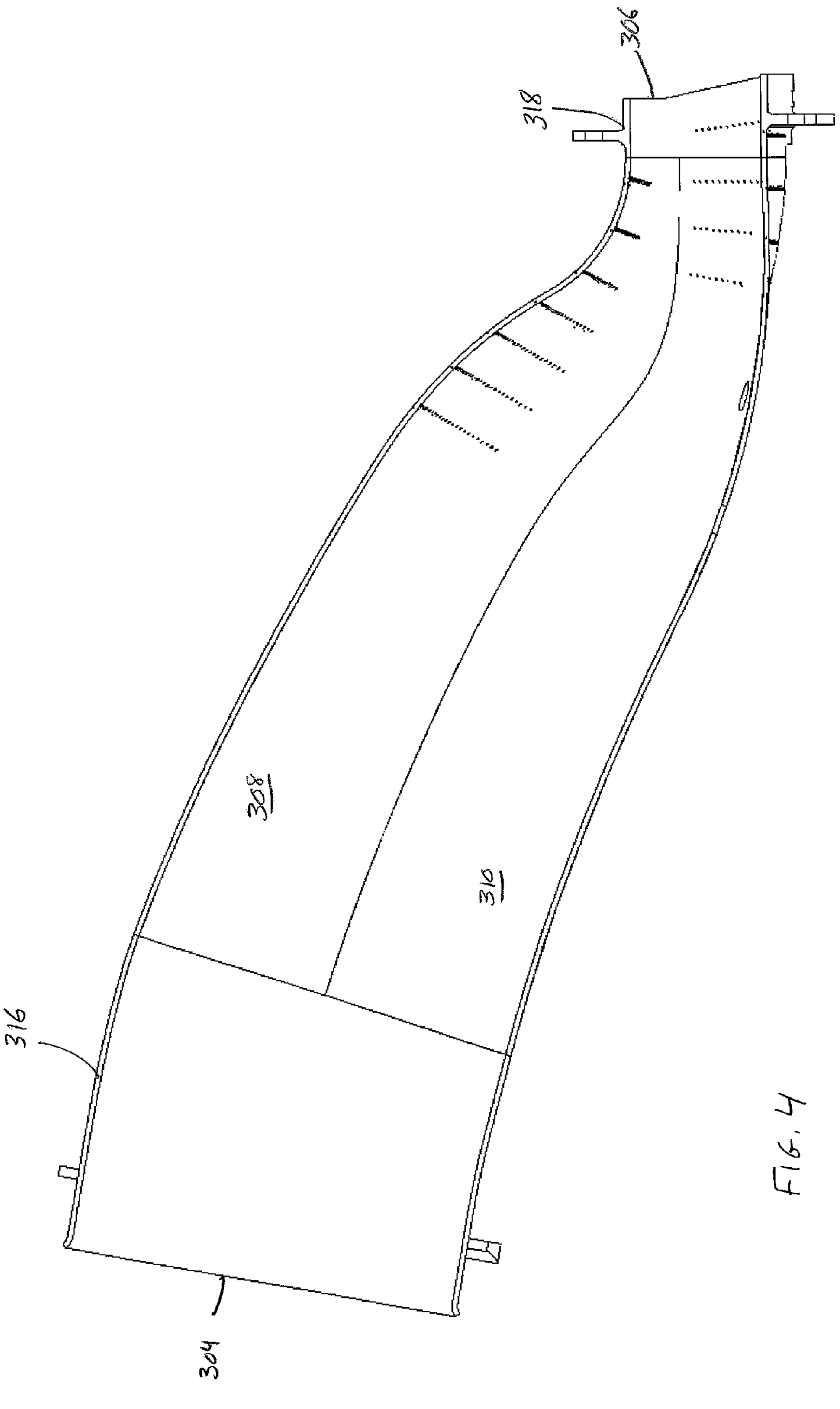
FIG. 4 is a cross section view of the embodiment of the present invention of FIG. 3.

The present invention is shown in FIGS. 3-8. Referring to FIGS. 3 and 4, a transition duct 300 includes a panel assembly 302 having an inlet end 304 of generally circular cross section and an outlet end 306 having a generally rectangular arc-like cross section. The panel assembly 302 comprises a first panel 308 and a second panel 310 joined together along a plurality of axial seams 312 by a means such as welding. In an embodiment of the present invention, the panel assembly 302 also contains a plurality of cooling holes 314 extending through the first panel 308 and the second panel 310, typically at a shallow angle relative to the surface of the first panel 308 and the second panel 310. The quantity and spacing of the cooling holes 314 can vary depending on the transition duct operating conditions and available cooling flow. One embodiment of the present invention includes seven rows of cooling holes located in the first panel 308, four rows of cooling holes in the second panel 310 and four rows along the sides, or regions where the first panel 308 is joined to the second panel 310.

The transition duct 300 further comprises an inlet ring 316 and an aft frame 318 fixed to the panel assembly 302. Because of the temperatures of the hot combustion gases passing through the transition duct, the panel assembly 302 is preferably formed from a high temperature nickel base alloy such as Haynes 230.

The panel assembly 302, formed from the first panel 308 and second panel 310, has an uncoated internal profile substantially in accordance with coordinate values X, Y, and Z as set forth in Table 1, carried only to three decimal places. Although the preferred unit of measure for the values given in Table 1 is inches, those skilled in the art will appreciate that the values of Table 1 for X, Y, and Z can be scaled up or down depending on the diameter of the particular of the particular combustion liner with which the present invention is to be used. This uncoated internal profile provides an optimized transition from a generally circular inlet end to a generally arc-like outlet end over the allowable axial and radial distance for a gas turbine engine, such that high steady stresses and stress concentrations in the transition duct 300 are minimized.

Figure 6:
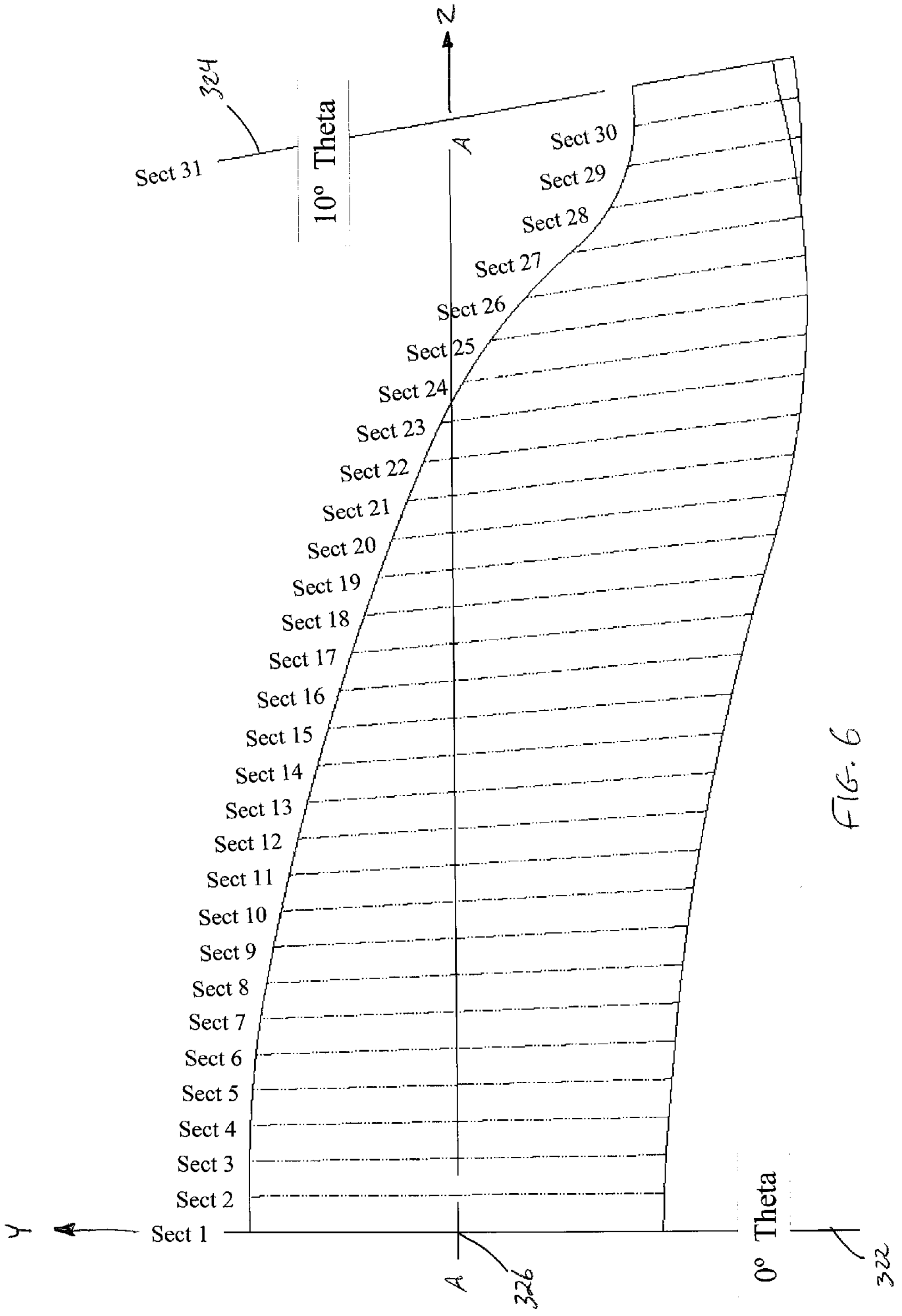
FIG. 6 is a side cross section view showing each of the individual cross sections that define the panel assembly in accordance with an embodiment of the present invention.
Figure 7:
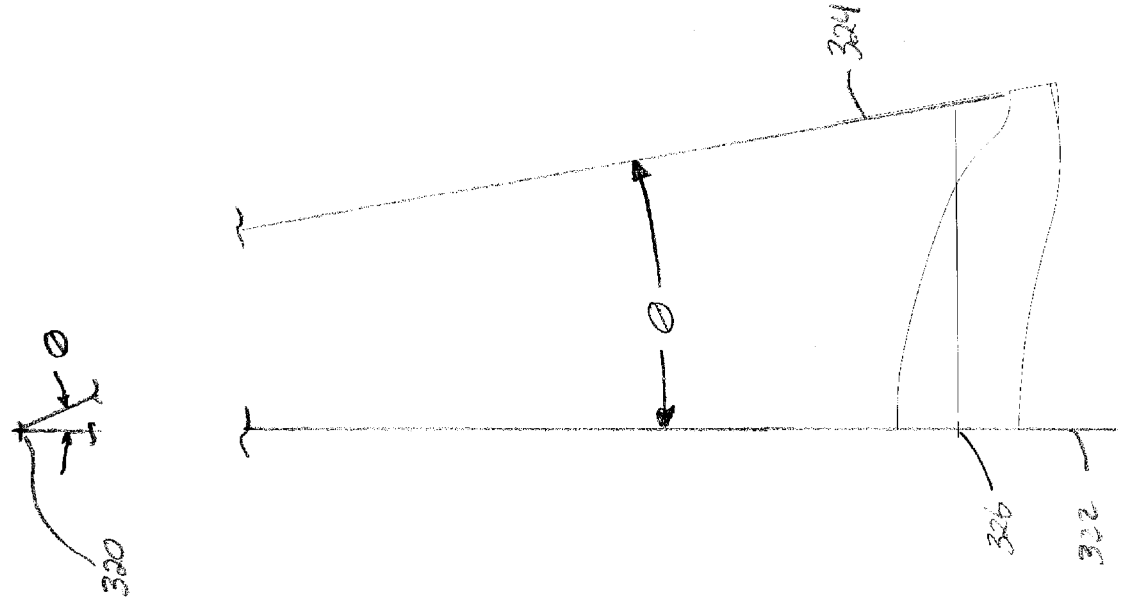
FIG. 7 is a side cross section view showing the transition duct panel assembly and sweep angle configuration in accordance with an embodiment of the present invention; and, FIG. 8 is a perspective view of the individual cross sections of FIG. 6 that define the panel assembly in accordance with an embodiment of the present invention.

Referring to FIGS. 6 and 7, for the purpose of describing the present invention, the coordinate values X, Y, and Z of Table 1 are taken at various sweep angles Θ wherein Θ is an angle measured from the inlet end 304 and increases to its maximum value at the outlet end 306. Sweep angle Θ originates at an intersection 320 formed from a first plane 322 that is defined by the inlet end 304 of the panel assembly 302 and a second plane 324, that is defined by the outlet end 306 of the panel assembly 302, as shown in FIG. 7. An origin 326 of the Cartesian coordinate system, from which the data in Table 1 is generated, is positioned at center of the inlet end 304 along an axis A-A that runs through the center of the inlet end 304 and is perpendicular to the first plane 322. The Cartesian coordinate system is oriented such that X and Y extend radially out from the origin 326, as shown in FIG. 3, and Z extends axially along axis A-A towards the outlet end 306, as shown in FIG. 6. Coordinate values X, Y, and Z are listed in Table 1 for each sweep angle Θ, taken in generally equal angular measurements of approximately 0.333333 degrees, or three sections for every one degree of sweep, so as to sufficiently define the optimized internal profile of the panel assembly 302. The data compiled in Table 1 is computer generated and when taken together, it represents the nominal uncoated internal profile, the data will vary depending on manufacturing tolerances. Therefore, it will be appreciated that a gas turbine of this size having the panel assembly 302 fabricated primarily from formed and welded sheet metal can be expected to have manufacturing tolerances upwards of +/−0.125 inches.

Figure 5:
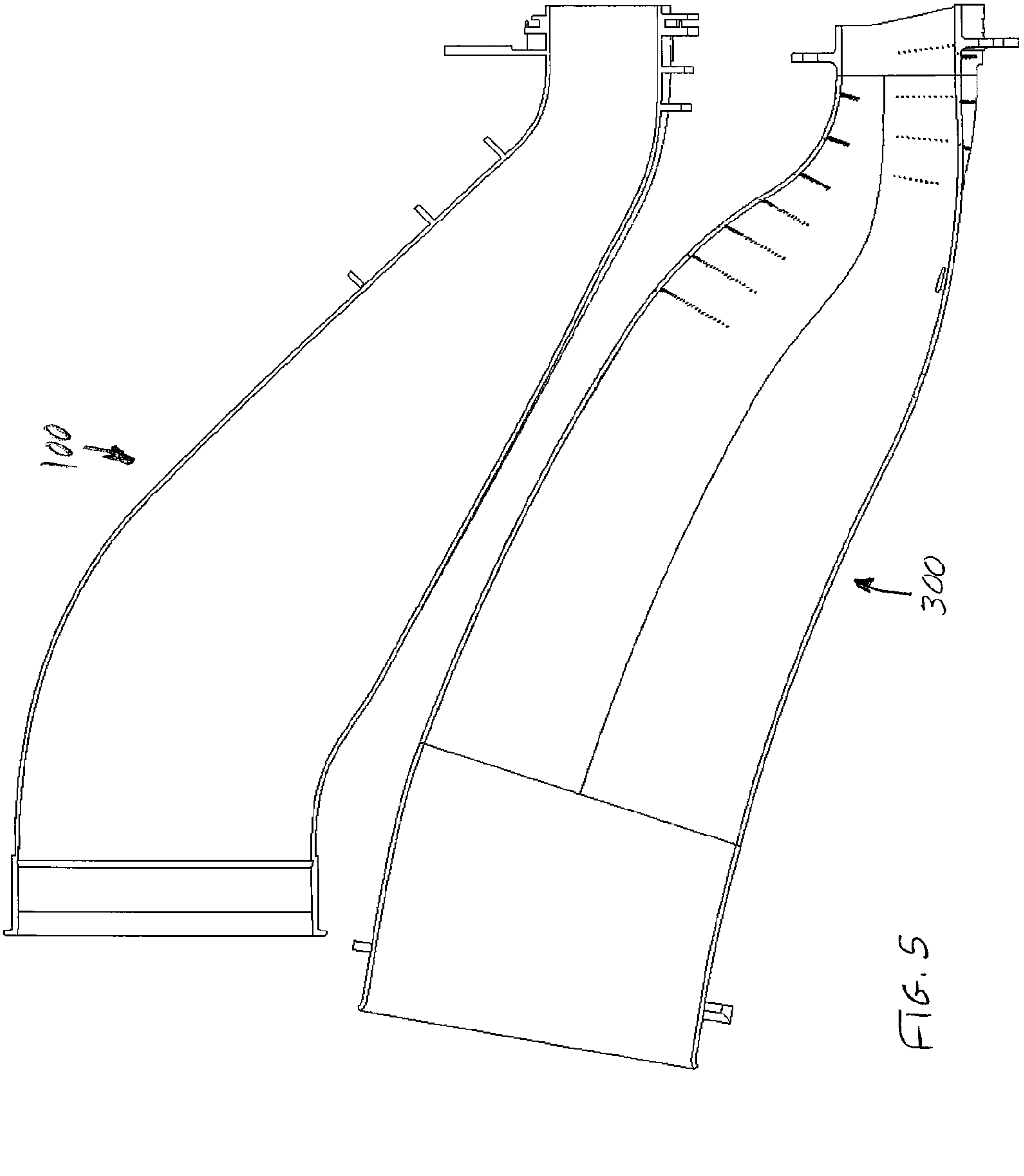
FIG. 5 is a side-by-side cross sectional comparison of an embodiment of the present invention and the prior art transition duct of FIG. 2.

Referring to FIG. 5, the differences in the profiles between the transition duct 100 of the prior art and the transition duct 300 of the present invention can be understood. For example, the start of the transition section, which is generally understood to be where the circular cross section changes to the rectangular-like cross section, starts in the last 25% of the length of transition duct 300 whereas in the prior art transition duct 100, the same transition begins in the first 25% of the transition duct length. Furthermore, the transition duct 300 of the present invention has a longer axial length than the transition duct 100 of the prior art.

Figure 8:
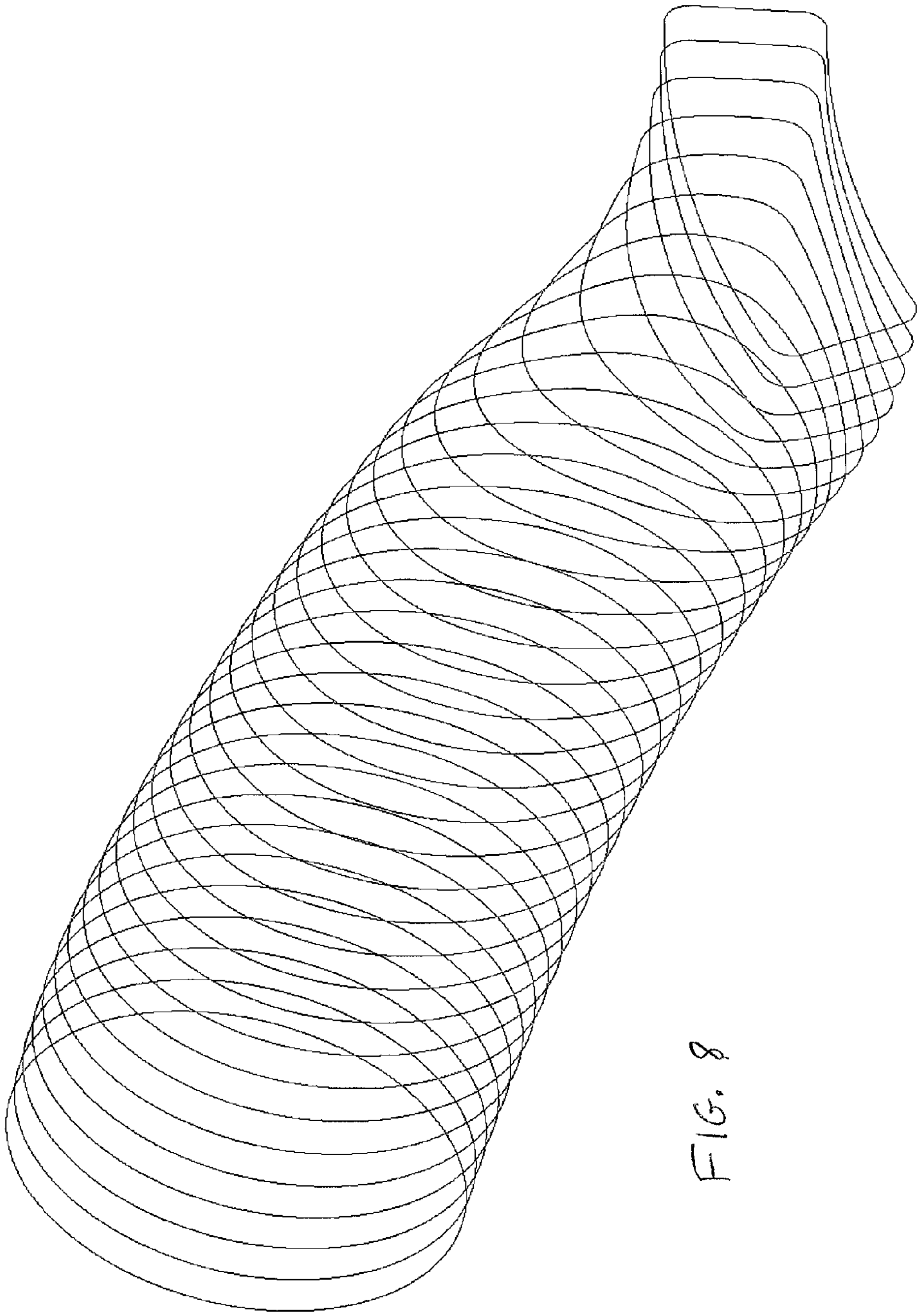

For the data listed in Table 1, a plurality of wireframe sections can be created when applying a best-fit curve to the section data for each sweep angle Θ. For example, FIGS. 6 and 8 show a series of wireframe cross sections taken at various sweep angles from the inlet end 304 to the outlet end 306 of the panel assembly 302. The wireframe sections are created by connecting the data points for each sweep angle Θ with a best fit curve. At the inlet end 304 a section is taken corresponding to Θ=0.0 while at the outlet end 306, a section is taken corresponding to Θ=10.0 degrees. Numerous other sections are taken therebetween at approximately every 0.333333 degrees so as to provide a sufficient number of coordinates through which best-fit curves can be generated and when taken together, form the panel assembly of the present invention.

An additional feature of the transition duct 300 is a protective coating applied along the internal profile of the panel assembly 302 to protect the transition duct 300 from deterioration associated with prolonged exposure to elevated temperatures. For example, a two-layer air plasma sprayed coating can be applied comprising a MCrAlY bond coating, where M can be selected from Ni, Co, NiCo, or some other acceptable composition, applied directly to the panel assembly and a Yttra Stabilized Zirconia top coating applied over the bond coating. For one embodiment of the two-layer coating, the combined coating thickness is at least 0.019 inches. The coating is preferably applied once the panel assembly 302 has been formed and welded in accordance with the profile as defined in Table 1.

In an alternate embodiment of the present invention there is provided a transition duct similar to that of the preferred embodiment except for the uncoated internal profile of the panel assembly 302 is within an envelope of +/−0.250 inches in a direction normal to any surface of the panel assembly substantially in accordance with the Cartesian coordinate values X, Y, and Z as set forth in Table 1. A distance of +/−0.250 inches in a direction normal to any surface of the panel assembly thereby defines a profile envelope for this specific transition duct panel assembly. This envelope ensures that all reasonable manufacturing tolerances are accommodated within the profile.

The X,Y,Z Cartesian coordinate data and corresponding sweep angles Θ are summarized in the following Table 1.

| Theta | X | Y | Z |
|---|---|---|---|
| Sect 1 | | | |
| 0.000000 | 0.0000 | 7.2020 | 0.0000 |
| 0.000000 | 0.9192 | 7.1432 | 0.0000 |
| 0.000000 | 1.8235 | 6.9673 | 0.0000 |
| 0.000000 | 2.6979 | 6.6776 | 0.0000 |
| 0.000000 | 3.6552 | 6.2053 | 0.0000 |

-continued

| Theta | X | Y | Z |
|---|---|---|---|
| 0.000000 | 4.5322 | 5.5969 | 0.0000 |
| 0.000000 | 5.3098 | 4.8655 | 0.0000 |
| 0.000000 | 5.9707 | 4.0273 | 0.0000 |
| 0.000000 | 6.5003 | 3.1005 | 0.0000 |
| 0.000000 | 6.8871 | 2.1056 | 0.0000 |
| 0.000000 | 7.1228 | 1.0645 | 0.0000 |
| 0.000000 | 7.2020 | 0.0000 | 0.0000 |
| 0.000000 | 7.1625 | −0.7528 | 0.0000 |
| 0.000000 | 7.0446 | −1.4974 | 0.0000 |
| 0.000000 | 6.7423 | −2.5316 | 0.0000 |
| 0.000000 | 6.2897 | −3.5082 | 0.0000 |
| 0.000000 | 5.6965 | −4.4063 | 0.0000 |
| 0.000000 | 4.9761 | −5.2061 | 0.0000 |
| 0.000000 | 4.1446 | −5.8897 | 0.0000 |
| 0.000000 | 3.2205 | −6.4416 | 0.0000 |
| 0.000000 | 2.2255 | −6.8495 | 0.0000 |
| 0.000000 | 1.1266 | −7.1134 | 0.0000 |
| 0.000000 | 0.0000 | −7.2020 | 0.0000 |
| Sect 2 | | | |
| 0.333333 | 0.0000 | 7.1963 | 1.2496 |
| 0.333333 | 0.9231 | 7.1372 | 1.2500 |
| 0.333333 | 1.8311 | 6.9599 | 1.2510 |
| 0.333333 | 2.7086 | 6.6671 | 1.2527 |
| 0.333333 | 3.6647 | 6.1927 | 1.2555 |
| 0.333333 | 4.5406 | 5.5829 | 1.2590 |
| 0.333333 | 5.3171 | 4.8506 | 1.2633 |
| 0.333333 | 5.9772 | 4.0119 | 1.2681 |
| 0.333333 | 6.5064 | 3.0851 | 1.2735 |
| 0.333333 | 6.8935 | 2.0904 | 1.2793 |
| 0.333333 | 7.1301 | 1.0498 | 1.2854 |
| 0.333333 | 7.2113 | −0.0145 | 1.2916 |
| 0.333333 | 7.1739 | −0.7707 | 1.2960 |
| 0.333333 | 7.0563 | −1.5188 | 1.3003 |
| 0.333333 | 6.7526 | −2.5530 | 1.3063 |
| 0.333333 | 6.2985 | −3.5295 | 1.3120 |
| 0.333333 | 5.7043 | −4.4275 | 1.3172 |
| 0.333333 | 4.9832 | −5.2273 | 1.3219 |
| 0.333333 | 4.1515 | −5.9114 | 1.3259 |
| 0.333333 | 3.2275 | −6.4645 | 1.3291 |
| 0.333333 | 2.2331 | −6.8749 | 1.3315 |
| 0.333333 | 1.1307 | −7.1422 | 1.3330 |
| 0.333333 | 0.0000 | −7.2313 | 1.3335 |
| Sect 3 | | | |
| 0.666666 | 0.0000 | 7.1743 | 2.4996 |
| 0.666666 | 0.9341 | 7.1143 | 2.5003 |
| 0.666666 | 1.8525 | 6.9327 | 2.5024 |
| 0.666666 | 2.7388 | 6.6314 | 2.5059 |
| 0.666666 | 3.6912 | 6.1516 | 2.5115 |
| 0.666666 | 4.5633 | 5.5381 | 2.5186 |
| 0.666666 | 5.3362 | 4.8035 | 2.5272 |
| 0.666666 | 5.9936 | 3.9638 | 2.5369 |
| 0.666666 | 6.5212 | 3.0371 | 2.5477 |
| 0.666666 | 6.9080 | 2.0435 | 2.5593 |
| 0.666666 | 7.1460 | 1.0041 | 2.5714 |
| 0.666666 | 7.2310 | −0.0589 | 2.5837 |
| 0.666666 | 7.1968 | −0.8289 | 2.5927 |
| 0.666666 | 7.0776 | −1.5903 | 2.6015 |
| 0.666666 | 6.7695 | −2.6227 | 2.6136 |
| 0.666666 | 6.3117 | −3.5969 | 2.6249 |
| 0.666666 | 5.7151 | −4.4928 | 2.6353 |
| 0.666666 | 4.9931 | −5.2913 | 2.6446 |
| 0.666666 | 4.1620 | −5.9752 | 2.6526 |
| 0.666666 | 3.2395 | −6.5299 | 2.6590 |
| 0.666666 | 2.2473 | −6.9447 | 2.6639 |
| 0.666666 | 1.1386 | −7.2189 | 2.6670 |
| 0.666666 | 0.0000 | −7.3086 | 2.6681 |
| Sect 4 | | | |
| 0.999999 | 0.0000 | 7.1284 | 3.7504 |
| 0.999999 | 0.9514 | 7.0666 | 3.7514 |
| 0.999999 | 1.8859 | 6.8779 | 3.7547 |
| 0.999999 | 2.7860 | 6.5637 | 3.7602 |
| 0.999999 | 3.7317 | 6.0765 | 3.7687 |
| 0.999999 | 4.5971 | 5.4579 | 3.7795 |
| 0.999999 | 5.3637 | 4.7204 | 3.7924 |
| 0.999999 | 6.0155 | 3.8798 | 3.8071 |

-continued

| Theta | X | Y | Z |
|---|---|---|---|
| 0.999999 | 6.5390 | 2.9537 | 3.8232 |
| 0.999999 | 6.9235 | 1.9619 | 3.8405 |
| 0.999999 | 7.1613 | 0.9252 | 3.8586 |
| 0.999999 | 7.2485 | −0.1350 | 3.8771 |
| 0.999999 | 7.2148 | −0.9342 | 3.8911 |
| 0.999999 | 7.0876 | −1.7239 | 3.9049 |
| 0.999999 | 6.7720 | −2.7494 | 3.9228 |
| 0.999999 | 6.3093 | −3.7164 | 3.9397 |
| 0.999999 | 5.7105 | −4.6056 | 3.9552 |
| 0.999999 | 4.9891 | −5.3987 | 3.9690 |
| 0.999999 | 4.1607 | −6.0791 | 3.9809 |
| 0.999999 | 3.2424 | −6.6324 | 3.9906 |
| 0.999999 | 2.2553 | −7.0484 | 3.9978 |
| 0.999999 | 1.1431 | −7.3268 | 4.0027 |
| 0.999999 | 0.0000 | −7.4168 | 4.0042 |
| Sect 5 | | | |
| 1.333332 | 0.0000 | 7.0504 | 5.0027 |
| 1.333332 | 0.9740 | 6.9857 | 5.0042 |
| 1.333332 | 1.9299 | 6.7873 | 5.0088 |
| 1.333332 | 2.8483 | 6.4564 | 5.0165 |
| 1.333332 | 3.7839 | 5.9610 | 5.0280 |
| 1.333332 | 4.6391 | 5.3371 | 5.0426 |
| 1.333332 | 5.3957 | 4.5967 | 5.0598 |
| 1.333332 | 6.0385 | 3.7555 | 5.0794 |
| 1.333332 | 6.5542 | 2.8311 | 5.1009 |
| 1.333332 | 6.9327 | 1.8426 | 5.1239 |
| 1.333332 | 7.1664 | 0.8104 | 5.1479 |
| 1.333332 | 7.2513 | −0.2448 | 5.1725 |
| 1.333332 | 7.2107 | −1.0951 | 5.1923 |
| 1.333332 | 7.0645 | −1.9337 | 5.2118 |
| 1.333332 | 6.7384 | −2.9438 | 5.2353 |
| 1.333332 | 6.2708 | −3.8953 | 5.2575 |
| 1.333332 | 5.6717 | −4.7704 | 5.2778 |
| 1.333332 | 4.9542 | −5.5509 | 5.2960 |
| 1.333332 | 4.1322 | −6.2210 | 5.3116 |
| 1.333332 | 3.2224 | −6.7658 | 5.3243 |
| 1.333332 | 2.2447 | −7.1742 | 5.3338 |
| 1.333332 | 1.1373 | −7.4481 | 5.3401 |
| 1.333332 | 0.0000 | −7.5378 | 5.3422 |
| Sect 6 | | | |
| 1.666665 | 0.0000 | 6.9308 | 6.2575 |
| 1.666665 | 1.0016 | 6.8617 | 6.2595 |
| 1.666665 | 1.9832 | 6.6508 | 6.2656 |
| 1.666665 | 2.9239 | 6.3003 | 6.2758 |
| 1.666665 | 3.8456 | 5.7972 | 6.2905 |
| 1.666665 | 4.6863 | 5.1687 | 6.3087 |
| 1.666665 | 5.4285 | 4.4265 | 6.3303 |
| 1.666665 | 6.0577 | 3.5862 | 6.3548 |
| 1.666665 | 6.5609 | 2.6649 | 6.3816 |
| 1.666665 | 6.9280 | 1.6816 | 6.4102 |
| 1.666665 | 7.1514 | 0.6563 | 6.4400 |
| 1.666665 | 7.2263 | −0.3907 | 6.4705 |
| 1.666665 | 7.1659 | −1.3221 | 6.4976 |
| 1.666665 | 6.9838 | −2.2375 | 6.5242 |
| 1.666665 | 6.6451 | −3.2184 | 6.5528 |
| 1.666665 | 6.1747 | −4.1424 | 6.5797 |
| 1.666665 | 5.5802 | −4.9918 | 6.6044 |
| 1.666665 | 4.8723 | −5.7495 | 6.6264 |
| 1.666665 | 4.0637 | −6.3985 | 6.6453 |
| 1.666665 | 3.1695 | −6.9235 | 6.6606 |
| 1.666665 | 2.2090 | −7.3115 | 6.6719 |
| 1.666665 | 1.1177 | −7.5695 | 6.6794 |
| 1.666665 | 0.0000 | −7.6582 | 6.6820 |
| Sect 7 | | | |
| 1.999998 | 0.0000 | 6.7577 | 7.5159 |
| 1.999998 | 1.0333 | 6.6826 | 7.5186 |
| 1.999998 | 2.0446 | 6.4564 | 7.5265 |
| 1.999998 | 3.0114 | 6.0838 | 7.5395 |
| 1.999998 | 3.9140 | 5.5756 | 7.5572 |
| 1.999998 | 4.7353 | 4.9445 | 7.5793 |
| 1.999998 | 5.4580 | 4.2027 | 7.6052 |
| 1.999998 | 6.0679 | 3.3657 | 7.6344 |
| 1.999998 | 6.5523 | 2.4506 | 7.6664 |
| 1.999998 | 6.9014 | 1.4758 | 7.7004 |
| 1.999998 | 7.1079 | 0.4612 | 7.7358 |

-continued

| Theta | X | Y | Z |
|---|---|---|---|
| 1.999998 | 7.1671 | −0.5725 | 7.7719 |
| 1.999998 | 7.0780 | −1.6071 | 7.8081 |
| 1.999998 | 6.8486 | −2.6201 | 7.8434 |
| 1.999998 | 6.5020 | −3.5586 | 7.8762 |
| 1.999998 | 6.0352 | −4.4423 | 7.9071 |
| 1.999998 | 5.4520 | −5.2541 | 7.9354 |
| 1.999998 | 4.7620 | −5.9773 | 7.9607 |
| 1.999998 | 3.9767 | −6.5957 | 7.9823 |
| 1.999998 | 3.1105 | −7.0948 | 7.9997 |
| 1.999998 | 2.1813 | −7.4606 | 8.0125 |
| 1.999998 | 1.1027 | −7.7077 | 8.0211 |
| 1.999998 | 0.0000 | −7.7957 | 8.0242 |
| Sect 8 | | | |
| 2.333331 | 0.0000 | 6.5258 | 8.7793 |
| 2.333331 | 1.0685 | 6.4431 | 8.7827 |
| 2.333331 | 2.1119 | 6.1999 | 8.7926 |
| 2.333331 | 3.1080 | 5.8048 | 8.8087 |
| 2.333331 | 3.9871 | 5.2953 | 8.8295 |
| 2.333331 | 4.7843 | 4.6659 | 8.8551 |
| 2.333331 | 5.4831 | 3.9287 | 8.8852 |
| 2.333331 | 6.0698 | 3.0997 | 8.9189 |
| 2.333331 | 6.5325 | 2.1956 | 8.9558 |
| 2.333331 | 6.8624 | 1.2353 | 8.9949 |
| 2.333331 | 7.0533 | 0.2380 | 9.0355 |
| 2.333331 | 7.1023 | −0.7762 | 9.0769 |
| 2.333331 | 6.9913 | −1.9091 | 9.1230 |
| 2.333331 | 6.7139 | −3.0131 | 9.1680 |
| 2.333331 | 6.3601 | −3.9069 | 9.2044 |
| 2.333331 | 5.8971 | −4.7481 | 9.2387 |
| 2.333331 | 5.3266 | −5.5205 | 9.2702 |
| 2.333331 | 4.6569 | −6.2089 | 9.2982 |
| 2.333331 | 3.8982 | −6.7977 | 9.3222 |
| 2.333331 | 3.0639 | −7.2736 | 9.3416 |
| 2.333331 | 2.1700 | −7.6225 | 9.3558 |
| 2.333331 | 1.0969 | −7.8671 | 9.3658 |
| 2.333331 | 0.0000 | −7.9551 | 9.3694 |
| Sect 9 | | | |
| 2.666664 | 0.0000 | 6.2700 | 10.0471 |
| 2.666664 | 1.1052 | 6.1797 | 10.0514 |
| 2.666664 | 2.1824 | 5.9177 | 10.0636 |
| 2.666664 | 3.2076 | 5.4955 | 10.0832 |
| 2.666664 | 4.0599 | 4.9835 | 10.1071 |
| 2.666664 | 4.8300 | 4.3553 | 10.1363 |
| 2.666664 | 5.5023 | 3.6233 | 10.1704 |
| 2.666664 | 6.0641 | 2.8037 | 10.2086 |
| 2.666664 | 6.5043 | 1.9129 | 10.2501 |
| 2.666664 | 6.8159 | 0.9695 | 10.2940 |
| 2.666664 | 6.9937 | −0.0080 | 10.3395 |
| 2.666664 | 7.0365 | −1.0003 | 10.3858 |
| 2.666664 | 6.9081 | −2.2259 | 10.4428 |
| 2.666664 | 6.5817 | −3.4143 | 10.4982 |
| 2.666664 | 6.1530 | −4.3980 | 10.5440 |
| 2.666664 | 5.5895 | −5.3104 | 10.5865 |
| 2.666664 | 4.8953 | −6.1285 | 10.6246 |
| 2.666664 | 4.0827 | −6.8292 | 10.6573 |
| 2.666664 | 3.1693 | −7.3923 | 10.6835 |
| 2.666664 | 2.1756 | −7.7977 | 10.7024 |
| 2.666664 | 1.1002 | −8.0475 | 10.7140 |
| 2.666664 | 0.0000 | −8.1367 | 10.7182 |
| Sect 10 | | | |
| 2.999997 | 0.0000 | 5.9949 | 11.3196 |
| 2.999997 | 1.1439 | 5.8966 | 11.3248 |
| 2.999997 | 2.2563 | 5.6130 | 11.3396 |
| 2.999997 | 3.3101 | 5.1577 | 11.3635 |
| 2.999997 | 4.1321 | 4.6413 | 11.3906 |
| 2.999997 | 4.8722 | 4.0138 | 11.4235 |
| 2.999997 | 5.5157 | 3.2875 | 11.4615 |
| 2.999997 | 6.0513 | 2.4787 | 11.5039 |
| 2.999997 | 6.4688 | 1.6031 | 11.5498 |
| 2.999997 | 6.7632 | 0.6789 | 11.5982 |
| 2.999997 | 6.9301 | −0.2765 | 11.6483 |
| 2.999997 | 6.9699 | −1.2453 | 11.6991 |
| 2.999997 | 6.9005 | −2.1225 | 11.7450 |
| 2.999997 | 6.7274 | −2.9852 | 11.7903 |
| 2.999997 | 6.4532 | −3.8213 | 11.8341 |

-continued

| Theta | X | Y | Z |
|---|---|---|---|
| 2.999997 | 6.0196 | −4.7547 | 11.8830 |
| 2.999997 | 5.4658 | −5.6161 | 11.9281 |
| 2.999997 | 4.7938 | −6.3894 | 11.9687 |
| 2.999997 | 4.0141 | −7.0539 | 12.0035 |
| 2.999997 | 3.1423 | −7.5925 | 12.0317 |
| 2.999997 | 2.1984 | −7.9863 | 12.0524 |
| 2.999997 | 1.1129 | −8.2490 | 12.0661 |
| 2.999997 | 0.0000 | −8.3412 | 12.0710 |
| Sect 11 | | | |
| 3.333330 | 0.0000 | 5.7000 | 12.5972 |
| 3.333330 | 0.8906 | 5.6394 | 12.6008 |
| 3.333330 | 1.7657 | 5.4629 | 12.6111 |
| 3.333330 | 2.6119 | 5.1784 | 12.6276 |
| 3.333330 | 3.4157 | 4.7903 | 12.6502 |
| 3.333330 | 4.2041 | 4.2682 | 12.6806 |
| 3.333330 | 4.9115 | 3.6411 | 12.7172 |
| 3.333330 | 5.5243 | 2.9213 | 12.7591 |
| 3.333330 | 6.0326 | 2.1247 | 12.8055 |
| 3.333330 | 6.4276 | 1.2664 | 12.8555 |
| 3.333330 | 6.7058 | 0.3634 | 12.9081 |
| 3.333330 | 6.8636 | −0.5681 | 12.9623 |
| 3.333330 | 6.9023 | −1.5118 | 13.0173 |
| 3.333330 | 6.8278 | −2.4431 | 13.0715 |
| 3.333330 | 6.6348 | −3.3583 | 13.1248 |
| 3.333330 | 6.3257 | −4.2411 | 13.1762 |
| 3.333330 | 5.8936 | −5.1180 | 13.2273 |
| 3.333330 | 5.3522 | −5.9284 | 13.2745 |
| 3.333330 | 4.7046 | −6.6572 | 13.3170 |
| 3.333330 | 3.9598 | −7.2865 | 13.3536 |
| 3.333330 | 3.1320 | −7.8023 | 13.3837 |
| 3.333330 | 2.2385 | −8.1885 | 13.4062 |
| 3.333330 | 1.1350 | −8.4714 | 13.4226 |
| 3.333330 | 0.0000 | −8.5688 | 13.4283 |
| Sect 12 | | | |
| 3.666663 | 0.0000 | 5.3849 | 13.8804 |
| 3.666663 | 0.9235 | 5.3191 | 13.8847 |
| 3.666663 | 1.8292 | 5.1267 | 13.8970 |
| 3.666663 | 2.7014 | 4.8159 | 13.9169 |
| 3.666663 | 3.5244 | 4.3923 | 13.9441 |
| 3.666663 | 4.3787 | 3.7792 | 13.9833 |
| 3.666663 | 5.1250 | 3.0408 | 14.0307 |
| 3.666663 | 5.7485 | 2.1963 | 14.0848 |
| 3.666663 | 6.2363 | 1.2673 | 14.1443 |
| 3.666663 | 6.5817 | 0.2765 | 14.2078 |
| 3.666663 | 6.7808 | −0.7535 | 14.2738 |
| 3.666663 | 6.8336 | −1.8014 | 14.3410 |
| 3.666663 | 6.7539 | −2.7812 | 14.4038 |
| 3.666663 | 6.5421 | −3.7434 | 14.4654 |
| 3.666663 | 6.2015 | −4.6680 | 14.5247 |
| 3.666663 | 5.7745 | −5.4914 | 14.5774 |
| 3.666663 | 5.2488 | −6.2509 | 14.6261 |
| 3.666663 | 4.6275 | −6.9355 | 14.6700 |
| 3.666663 | 3.9195 | −7.5302 | 14.7081 |
| 3.666663 | 3.1373 | −8.0240 | 14.7397 |
| 3.666663 | 2.2962 | −8.4046 | 14.7641 |
| 3.666663 | 1.1667 | −8.7148 | 14.7840 |
| 3.666663 | 0.0000 | −8.8198 | 14.7907 |
| Sect 13 | | | |
| 3.999996 | 0.0000 | 5.0492 | 15.1697 |
| 3.999996 | 0.9586 | 4.9776 | 15.1747 |
| 3.999996 | 1.8965 | 4.7672 | 15.1894 |
| 3.999996 | 2.7952 | 4.4263 | 15.2133 |
| 3.999996 | 3.6365 | 3.9621 | 15.2457 |
| 3.999996 | 4.4465 | 3.3423 | 15.2891 |
| 3.999996 | 5.1511 | 2.6073 | 15.3405 |
| 3.999996 | 5.7381 | 1.7757 | 15.3986 |
| 3.999996 | 6.1972 | 0.8672 | 15.4622 |
| 3.999996 | 6.5229 | −0.0965 | 15.5295 |
| 3.999996 | 6.7119 | −1.0958 | 15.5994 |
| 3.999996 | 6.7639 | −2.1125 | 15.6705 |
| 3.999996 | 6.6773 | −3.1369 | 15.7421 |
| 3.999996 | 6.4478 | −4.1403 | 15.8123 |
| 3.999996 | 6.0808 | −5.1021 | 15.8796 |
| 3.999996 | 5.5704 | −6.0205 | 15.9438 |
| 3.999996 | 4.9306 | −6.8491 | 16.0017 |

-continued

| Theta | X | Y | Z |
|---|---|---|---|
| 3.999996 | 4.1726 | −7.5721 | 16.0523 |
| 3.999996 | 3.3126 | −8.1715 | 16.0942 |
| 3.999996 | 2.3719 | −8.6348 | 16.1266 |
| 3.999996 | 1.2083 | −8.9794 | 16.1507 |
| 3.999996 | 0.0000 | −9.0950 | 16.1588 |
| Sect 14 | | | |
| 4.333329 | 0.0000 | 4.6919 | 16.4656 |
| 4.333329 | 0.9960 | 4.6138 | 16.4715 |
| 4.333329 | 1.9680 | 4.3830 | 16.4890 |
| 4.333329 | 2.8937 | 4.0078 | 16.5174 |
| 4.333329 | 3.7522 | 3.4979 | 16.5561 |
| 4.333329 | 4.5154 | 2.8723 | 16.6035 |
| 4.333329 | 5.1769 | 2.1422 | 16.6588 |
| 4.333329 | 5.7271 | 1.3253 | 16.7207 |
| 4.333329 | 6.1575 | 0.4396 | 16.7878 |
| 4.333329 | 6.4641 | −0.4956 | 16.8587 |
| 4.333329 | 6.6431 | −1.4634 | 16.9320 |
| 4.333329 | 6.6930 | −2.4467 | 17.0065 |
| 4.333329 | 6.5970 | −3.5104 | 17.0871 |
| 4.333329 | 6.3501 | −4.5519 | 17.1660 |
| 4.333329 | 5.9611 | −5.5491 | 17.2416 |
| 4.333329 | 5.4710 | −6.4047 | 17.3064 |
| 4.333329 | 4.8615 | −7.1781 | 17.3650 |
| 4.333329 | 4.1463 | −7.8556 | 17.4164 |
| 4.333329 | 3.3412 | −8.4249 | 17.4595 |
| 4.333329 | 2.4660 | −8.8796 | 17.4940 |
| 4.333329 | 1.6709 | −9.1655 | 17.5156 |
| 4.333329 | 0.8433 | −9.3374 | 17.5287 |
| 4.333329 | 0.0000 | −9.3953 | 17.5330 |
| Sect 15 | | | |
| 4.666662 | 0.0000 | 4.3124 | 17.7686 |
| 4.666662 | 1.0361 | 4.2267 | 17.7756 |
| 4.666662 | 2.0441 | 3.9727 | 17.7963 |
| 4.666662 | 2.9974 | 3.5590 | 17.8301 |
| 4.666662 | 3.8716 | 2.9979 | 17.8759 |
| 4.666662 | 4.5867 | 2.3677 | 17.9273 |
| 4.666662 | 5.2041 | 1.6449 | 17.9863 |
| 4.666662 | 5.7173 | 0.8451 | 18.0516 |
| 4.666662 | 6.1193 | −0.0157 | 18.1219 |
| 4.666662 | 6.4066 | −0.9212 | 18.1958 |
| 4.666662 | 6.5747 | −1.8561 | 18.2721 |
| 4.666662 | 6.6211 | −2.8049 | 18.3495 |
| 4.666662 | 6.5135 | −3.9024 | 18.4391 |
| 4.666662 | 6.2511 | −4.9758 | 18.5268 |
| 4.666662 | 5.8450 | −6.0038 | 18.6107 |
| 4.666662 | 5.3790 | −6.7997 | 18.6756 |
| 4.666662 | 4.8041 | −7.5196 | 18.7344 |
| 4.666662 | 4.1348 | −8.1534 | 18.7861 |
| 4.666662 | 3.3872 | −8.6939 | 18.8303 |
| 4.666662 | 2.5790 | −9.1391 | 18.8666 |
| 4.666662 | 1.7520 | −9.4614 | 18.8929 |
| 4.666662 | 0.8856 | −9.6555 | 18.9088 |
| 4.666662 | 0.0000 | −9.7213 | 18.9141 |
| Sect 16 | | | |
| 4.999995 | 0.0000 | 3.9099 | 19.0792 |
| 4.999995 | 1.0792 | 3.8155 | 19.0875 |
| 4.999995 | 2.1253 | 3.5353 | 19.1120 |
| 4.999995 | 3.1068 | 3.0783 | 19.1520 |
| 4.999995 | 3.9952 | 2.4605 | 19.2060 |
| 4.999995 | 4.7629 | 1.7143 | 19.2713 |
| 4.999995 | 5.4032 | 0.8613 | 19.3459 |
| 4.999995 | 5.9102 | −0.0777 | 19.4281 |
| 4.999995 | 6.2735 | −1.0804 | 19.5158 |
| 4.999995 | 6.4884 | −2.1244 | 19.6071 |
| 4.999995 | 6.5478 | −3.1887 | 19.7003 |
| 4.999995 | 6.4289 | −4.3134 | 19.7987 |
| 4.999995 | 6.1528 | −5.4143 | 19.8950 |
| 4.999995 | 5.7317 | −6.4682 | 19.9872 |
| 4.999995 | 5.1682 | −7.3788 | 20.0668 |
| 4.999995 | 4.4573 | −8.1794 | 20.1369 |
| 4.999995 | 3.6282 | −8.8582 | 20.1963 |
| 4.999995 | 2.7111 | −9.4138 | 20.2449 |
| 4.999995 | 1.8460 | −9.7781 | 20.2768 |
| 4.999995 | 0.9359 | −9.9984 | 20.2960 |
| 4.999995 | 0.0000 | −10.0736 | 20.3026 |

-continued

| Theta | X | Y | Z |
|---|---|---|---|
| Sect 17 | | | |
| 5.333328 | 0.0000 | 3.4838 | 20.3981 |
| 5.333328 | 0.9023 | 3.4170 | 20.4043 |
| 5.333328 | 1.7846 | 3.2176 | 20.4229 |
| 5.333328 | 2.6274 | 2.8897 | 20.4535 |
| 5.333328 | 3.4119 | 2.4409 | 20.4954 |
| 5.333328 | 4.1230 | 1.8837 | 20.5475 |
| 5.333328 | 4.8311 | 1.1402 | 20.6169 |
| 5.333328 | 5.4215 | 0.3043 | 20.6949 |
| 5.333328 | 5.8888 | −0.6061 | 20.7799 |
| 5.333328 | 6.2240 | −1.5725 | 20.8701 |
| 5.333328 | 6.4212 | −2.5757 | 20.9638 |
| 5.333328 | 6.4734 | −3.5967 | 21.0591 |
| 5.333328 | 6.3452 | −4.7450 | 21.1663 |
| 5.333328 | 6.0576 | −5.8683 | 21.2711 |
| 5.333328 | 5.6212 | −6.9424 | 21.3714 |
| 5.333328 | 5.0976 | −7.7809 | 21.4497 |
| 5.333328 | 4.4463 | −8.5243 | 21.5191 |
| 5.333328 | 3.6934 | −9.1657 | 21.5790 |
| 5.333328 | 2.8627 | −9.7038 | 21.6292 |
| 5.333328 | 1.9564 | −10.1155 | 21.6676 |
| 5.333328 | 0.9927 | −10.3674 | 21.6911 |
| 5.333328 | 0.0000 | −10.4532 | 21.6992 |
| Sect 18 | | | |
| 5.666661 | 0.0000 | 3.0333 | 21.7258 |
| 5.666661 | 0.9429 | 2.9589 | 21.7332 |
| 5.666661 | 1.8616 | 2.7374 | 21.7551 |
| 5.666661 | 2.7334 | 2.3738 | 21.7912 |
| 5.666661 | 3.5376 | 1.8773 | 21.8405 |
| 5.666661 | 4.2553 | 1.2651 | 21.9012 |
| 5.666661 | 4.9030 | 0.5285 | 21.9743 |
| 5.666661 | 5.4427 | −0.2870 | 22.0552 |
| 5.666661 | 5.8694 | −1.1667 | 22.1425 |
| 5.666661 | 6.1750 | −2.0949 | 22.2346 |
| 5.666661 | 6.3531 | −3.0553 | 22.3299 |
| 5.666661 | 6.3976 | −4.0310 | 22.4267 |
| 5.666661 | 6.3152 | −4.9089 | 22.5138 |
| 5.666661 | 6.1339 | −5.7744 | 22.5997 |
| 5.666661 | 5.8709 | −6.6187 | 22.6835 |
| 5.666661 | 5.5132 | −7.4276 | 22.7638 |
| 5.666661 | 5.0324 | −8.1930 | 22.8397 |
| 5.666661 | 4.4472 | −8.8827 | 22.9081 |
| 5.666661 | 3.7766 | −9.4908 | 22.9685 |
| 5.666661 | 3.0343 | −10.0096 | 23.0200 |
| 5.666661 | 2.0805 | −10.4758 | 23.0662 |
| 5.666661 | 1.0583 | −10.7635 | 23.0948 |
| 5.666661 | 0.0000 | −10.8611 | 23.1045 |
| Sect 19 | | | |
| 5.999994 | 0.0000 | 2.5571 | 23.0629 |
| 5.999994 | 0.9863 | 2.4740 | 23.0717 |
| 5.999994 | 1.9445 | 2.2268 | 23.0977 |
| 5.999994 | 2.8471 | 1.8225 | 23.1402 |
| 5.999994 | 3.6691 | 1.2741 | 23.1978 |
| 5.999994 | 4.3925 | 0.6018 | 23.2684 |
| 5.999994 | 4.9794 | −0.1232 | 23.3446 |
| 5.999994 | 5.4674 | −0.9149 | 23.4279 |
| 5.999994 | 5.8521 | −1.7612 | 23.5168 |
| 5.999994 | 6.1262 | −2.6491 | 23.6101 |
| 5.999994 | 6.2836 | −3.5646 | 23.7064 |
| 5.999994 | 6.3204 | −4.4926 | 23.8039 |
| 5.999994 | 6.2390 | −5.3814 | 23.8973 |
| 5.999994 | 6.0587 | −6.2579 | 23.9894 |
| 5.999994 | 5.7856 | −7.1101 | 24.0790 |
| 5.999994 | 5.4087 | −7.9222 | 24.1644 |
| 5.999994 | 4.9726 | −8.6143 | 24.2371 |
| 5.999994 | 4.4621 | −9.2542 | 24.3044 |
| 5.999994 | 3.8812 | −9.8315 | 24.3650 |
| 5.999994 | 3.2269 | −10.3248 | 24.4169 |
| 5.999994 | 2.2193 | −10.8488 | 24.4720 |
| 5.999994 | 1.1313 | −11.1767 | 24.5064 |
| 5.999994 | 0.0000 | −11.2882 | 24.5181 |
| Sect 20 | | | |
| 6.333327 | 0.0000 | 2.0541 | 24.4103 |
| 6.333327 | 1.0337 | 1.9607 | 24.4206 |

-continued

| Theta | X | Y | Z |
|---|---|---|---|
| 6.333327 | 2.0336 | 1.6837 | 24.4514 |
| 6.333327 | 2.9675 | 1.2334 | 24.5014 |
| 6.333327 | 3.8077 | 0.6273 | 24.5686 |
| 6.333327 | 4.5351 | −0.1091 | 24.6504 |
| 6.333327 | 5.1541 | −0.9636 | 24.7452 |
| 6.333327 | 5.6440 | −1.8993 | 24.8490 |
| 6.333327 | 5.9933 | −2.8941 | 24.9595 |
| 6.333327 | 6.1933 | −3.9278 | 25.0742 |
| 6.333327 | 6.2418 | −4.9811 | 25.1911 |
| 6.333327 | 6.1687 | −5.8767 | 25.2905 |
| 6.333327 | 6.0023 | −6.7599 | 25.3885 |
| 6.333327 | 5.7331 | −7.6175 | 25.4837 |
| 6.333327 | 5.3505 | −8.4314 | 25.5740 |
| 6.333327 | 4.9693 | −9.0564 | 25.6434 |
| 6.333327 | 4.5314 | −9.6432 | 25.7085 |
| 6.333327 | 4.0259 | −10.1731 | 25.7674 |
| 6.333327 | 3.4447 | −10.6202 | 25.8170 |
| 6.333327 | 2.6490 | −11.0623 | 25.8661 |
| 6.333327 | 1.7985 | −11.3894 | 25.9024 |
| 6.333327 | 0.9094 | −11.5897 | 25.9246 |
| 6.333327 | 0.0000 | −11.6565 | 25.9320 |
| Sect 21 | | | |
| 6.666660 | 0.0000 | 1.5231 | 25.7685 |
| 6.666660 | 1.0851 | 1.4176 | 25.7808 |
| 6.666660 | 2.1295 | 1.1060 | 25.8172 |
| 6.666660 | 3.0954 | 0.6035 | 25.8759 |
| 6.666660 | 3.9531 | −0.0657 | 25.9542 |
| 6.666660 | 4.6832 | −0.8708 | 26.0483 |
| 6.666660 | 5.2315 | −1.6976 | 26.1449 |
| 6.666660 | 5.6593 | −2.5919 | 26.2494 |
| 6.666660 | 5.9575 | −3.5366 | 26.3598 |
| 6.666660 | 6.1266 | −4.5125 | 26.4739 |
| 6.666660 | 6.1820 | −5.5014 | 26.5895 |
| 6.666660 | 6.1542 | −6.3967 | 26.6941 |
| 6.666660 | 6.0354 | −7.2841 | 26.7979 |
| 6.666660 | 5.7896 | −8.1451 | 26.8985 |
| 6.666660 | 5.4051 | −8.9544 | 26.9931 |
| 6.666660 | 5.0629 | −9.5114 | 27.0582 |
| 6.666660 | 4.6738 | −10.0371 | 27.1196 |
| 6.666660 | 4.2184 | −10.5066 | 27.1745 |
| 6.666660 | 3.6910 | −10.8949 | 27.2199 |
| 6.666660 | 2.8334 | −11.3500 | 27.2731 |
| 6.666660 | 1.9209 | −11.6836 | 27.3121 |
| 6.666660 | 0.9700 | −11.8854 | 27.3357 |
| 6.666660 | 0.0000 | −11.9519 | 27.3435 |
| Sect 22 | | | |
| 6.999993 | 0.0000 | 0.9627 | 27.1383 |
| 6.999993 | 0.9547 | 0.8790 | 27.1486 |
| 6.999993 | 1.8802 | 0.6318 | 27.1789 |
| 6.999993 | 2.7501 | 0.2323 | 27.2280 |
| 6.999993 | 3.5425 | −0.3030 | 27.2937 |
| 6.999993 | 4.2399 | −0.9558 | 27.3738 |
| 6.999993 | 4.8311 | −1.7049 | 27.4658 |
| 6.999993 | 5.2962 | −2.4984 | 27.5633 |
| 6.999993 | 5.6571 | −3.3438 | 27.6671 |
| 6.999993 | 5.9185 | −4.2244 | 27.7752 |
| 6.999993 | 6.0908 | −5.1268 | 27.8860 |
| 6.999993 | 6.1876 | −6.0402 | 27.9981 |
| 6.999993 | 6.2268 | −6.9284 | 28.1072 |
| 6.999993 | 6.1618 | −7.8145 | 28.2160 |
| 6.999993 | 5.9408 | −8.6749 | 28.3216 |
| 6.999993 | 5.5530 | −9.4750 | 28.4199 |
| 6.999993 | 5.2373 | −9.9657 | 28.4801 |
| 6.999993 | 4.8778 | −10.4255 | 28.5366 |
| 6.999993 | 4.4546 | −10.8276 | 28.5860 |
| 6.999993 | 3.9683 | −11.1523 | 28.6258 |
| 6.999993 | 3.0358 | −11.6005 | 28.6809 |
| 6.999993 | 2.0522 | −11.9230 | 28.7204 |
| 6.999993 | 1.0343 | −12.1146 | 28.7440 |
| 6.999993 | 0.0000 | −12.1771 | 28.7516 |
| Sect 23 | | | |
| 7.333326 | 0.0000 | 0.3465 | 28.5238 |
| 7.333326 | 1.0128 | 0.2452 | 28.5368 |
| 7.333326 | 1.9852 | −0.0522 | 28.5751 |
| 7.333326 | 2.8832 | −0.5281 | 28.6363 |

-continued

| Theta | X | Y | Z |
|---|---|---|---|
| 7.333326 | 3.6806 | −1.1560 | 28.7172 |
| 7.333326 | 4.3669 | −1.9017 | 28.8131 |
| 7.333326 | 4.9451 | −2.7344 | 28.9203 |
| 7.333326 | 5.4229 | −3.6381 | 29.0366 |
| 7.333326 | 5.7958 | −4.5892 | 29.1590 |
| 7.333326 | 6.0717 | −5.5722 | 29.2855 |
| 7.333326 | 6.2673 | −6.5745 | 29.4145 |
| 7.333326 | 6.3782 | −7.4490 | 29.5270 |
| 7.333326 | 6.3603 | −8.3292 | 29.6403 |
| 7.333326 | 6.1604 | −9.1865 | 29.7506 |
| 7.333326 | 5.7710 | −9.9770 | 29.8524 |
| 7.333326 | 5.4746 | −10.4058 | 29.9075 |
| 7.333326 | 5.1323 | −10.7993 | 29.9582 |
| 7.333326 | 4.7317 | −11.1337 | 30.0012 |
| 7.333326 | 4.2796 | −11.3959 | 30.0350 |
| 7.333326 | 3.2590 | −11.8149 | 30.0889 |
| 7.333326 | 2.1947 | −12.1079 | 30.1266 |
| 7.333326 | 1.1033 | −12.2784 | 30.1485 |
| 7.333326 | 0.0000 | −12.3338 | 30.1557 |
| | Sect 24 | | |
| 7.666659 | 0.0000 | −0.4245 | 29.9394 |
| 7.666659 | 1.0658 | −0.5528 | 29.9566 |
| 7.666659 | 2.0740 | −0.9185 | 30.0059 |
| 7.666659 | 2.9859 | −1.4813 | 30.0816 |
| 7.666659 | 3.7844 | −2.1944 | 30.1776 |
| 7.666659 | 4.4755 | −3.0108 | 30.2875 |
| 7.666659 | 5.0754 | −3.8956 | 30.4066 |
| 7.666659 | 5.5036 | −4.6515 | 30.5084 |
| 7.666659 | 5.8729 | −5.4376 | 30.6142 |
| 7.666659 | 6.1801 | −6.2489 | 30.7234 |
| 7.666659 | 6.4274 | −7.0808 | 30.8354 |
| 7.666659 | 6.5970 | −7.9373 | 30.9507 |
| 7.666659 | 6.6085 | −8.8091 | 31.0681 |
| 7.666659 | 6.4222 | −9.6609 | 31.1827 |
| 7.666659 | 6.0374 | −10.4443 | 31.2882 |
| 7.666659 | 5.7586 | −10.8190 | 31.3386 |
| 7.666659 | 5.4284 | −11.1501 | 31.3832 |
| 7.666659 | 5.0480 | −11.4228 | 31.4199 |
| 7.666659 | 4.6272 | −11.6293 | 31.4477 |
| 7.666659 | 3.7336 | −11.9318 | 31.4884 |
| 7.666659 | 2.8163 | −12.1543 | 31.5184 |
| 7.666659 | 1.8843 | −12.3061 | 31.5388 |
| 7.666659 | 0.9440 | −12.3945 | 31.5507 |
| 7.666659 | 0.0000 | −12.4237 | 31.5546 |
| | Sect 25 | | |
| 7.999992 | 0.0000 | −1.3924 | 31.3938 |
| 7.999992 | 0.9486 | −1.5068 | 31.4099 |
| 7.999992 | 1.8494 | −1.8231 | 31.4544 |
| 7.999992 | 2.6767 | −2.2984 | 31.5212 |
| 7.999992 | 3.4251 | −2.8889 | 31.6041 |
| 7.999992 | 4.1026 | −3.5585 | 31.6982 |
| 7.999992 | 4.7236 | −4.2798 | 31.7996 |
| 7.999992 | 5.3031 | −5.0349 | 31.9058 |
| 7.999992 | 5.7123 | −5.6226 | 31.9883 |
| 7.999992 | 6.0844 | −6.2339 | 32.0743 |
| 7.999992 | 6.4088 | −6.8712 | 32.1638 |
| 7.999992 | 6.6722 | −7.5355 | 32.2572 |
| 7.999992 | 6.8694 | −8.3757 | 32.3753 |
| 7.999992 | 6.8833 | −9.2380 | 32.4965 |
| 7.999992 | 6.7002 | −10.0811 | 32.6149 |
| 7.999992 | 6.3301 | −10.8612 | 32.7246 |
| 7.999992 | 6.0728 | −11.1930 | 32.7712 |
| 7.999992 | 5.7581 | −11.4720 | 32.8104 |
| 7.999992 | 5.4004 | −11.6944 | 32.8417 |
| 7.999992 | 5.0094 | −11.8525 | 32.8639 |
| 7.999992 | 4.0260 | −12.0883 | 32.8970 |
| 7.999992 | 3.0277 | −12.2523 | 32.9201 |
| 7.999992 | 2.0218 | −12.3618 | 32.9355 |
| 7.999992 | 1.0117 | −12.4261 | 32.9445 |
| 7.999992 | 0.0000 | −12.4480 | 32.9476 |
| | Sect 26 | | |
| 8.333325 | 0.0000 | −2.6268 | 32.9010 |
| 8.333325 | 0.9626 | −2.7440 | 32.9181 |
| 8.333325 | 1.8792 | −3.0582 | 32.9642 |
| 8.333325 | 2.7330 | −3.5157 | 33.0312 |

-continued

| Theta | X | Y | Z |
|---|---|---|---|
| 8.333325 | 3.5282 | −4.0674 | 33.1120 |
| 8.333325 | 4.2767 | −4.6805 | 33.2018 |
| 8.333325 | 4.9943 | −5.3287 | 33.2967 |
| 8.333325 | 5.6918 | −5.9981 | 33.3948 |
| 8.333325 | 6.0954 | −6.4241 | 33.4572 |
| 8.333325 | 6.4580 | −6.8846 | 33.5247 |
| 8.333325 | 6.7667 | −7.3820 | 33.5975 |
| 8.333325 | 7.0019 | −7.9170 | 33.6759 |
| 8.333325 | 7.1762 | −8.7501 | 33.7979 |
| 8.333325 | 7.1598 | −9.6014 | 33.9226 |
| 8.333325 | 6.9716 | −10.4325 | 34.0443 |
| 8.333325 | 6.6278 | −11.2127 | 34.1586 |
| 8.333325 | 6.3970 | −11.5138 | 34.2027 |
| 8.333325 | 6.1015 | −11.7532 | 34.2378 |
| 8.333325 | 5.7665 | −11.9350 | 34.2644 |
| 8.333325 | 5.4030 | −12.0510 | 34.2814 |
| 8.333325 | 4.3296 | −12.2001 | 34.3033 |
| 8.333325 | 3.2498 | −12.2947 | 34.3171 |
| 8.333325 | 2.1675 | −12.3567 | 34.3262 |
| 8.333325 | 1.0840 | −12.3943 | 34.3317 |
| 8.333325 | 0.0000 | −12.4081 | 34.3337 |
| | Sect 27 | | |
| 8.666658 | 0.0000 | −4.2537 | 34.4849 |
| 8.666658 | 0.9677 | −4.3325 | 34.4969 |
| 8.666658 | 1.9135 | −4.5510 | 34.5302 |
| 8.666658 | 2.8274 | −4.8774 | 34.5800 |
| 8.666658 | 3.7139 | −5.2711 | 34.6400 |
| 8.666658 | 4.5756 | −5.7155 | 34.7077 |
| 8.666658 | 5.4179 | −6.1950 | 34.7808 |
| 8.666658 | 6.2422 | −6.7041 | 34.8584 |
| 8.666658 | 6.6241 | −7.0010 | 34.9037 |
| 8.666658 | 6.9512 | −7.3561 | 34.9578 |
| 8.666658 | 7.2134 | −7.7603 | 35.0194 |
| 8.666658 | 7.3850 | −8.2092 | 35.0878 |
| 8.666658 | 7.4829 | −9.0437 | 35.2150 |
| 8.666658 | 7.4156 | −9.8823 | 35.3428 |
| 8.666658 | 7.2195 | −10.7011 | 35.4676 |
| 8.666658 | 6.9090 | −11.4842 | 35.5870 |
| 8.666658 | 6.7068 | −11.7648 | 35.6298 |
| 8.666658 | 6.4320 | −11.9768 | 35.6621 |
| 8.666658 | 6.1177 | −12.1262 | 35.6849 |
| 8.666658 | 5.7786 | −12.2062 | 35.6971 |
| 8.666658 | 4.8165 | −12.2522 | 35.7041 |
| 8.666658 | 3.8533 | −12.2726 | 35.7072 |
| 8.666658 | 2.8901 | −12.2847 | 35.7090 |
| 8.666658 | 1.9267 | −12.2937 | 35.7104 |
| 8.666658 | 0.9634 | −12.3010 | 35.7115 |
| 8.666658 | 0.0000 | −12.3048 | 35.7121 |
| | Sect 28 | | |
| 8.999991 | 0.0000 | −5.6591 | 36.0555 |
| 8.999991 | 1.0073 | −5.6871 | 36.0599 |
| 8.999991 | 2.0108 | −5.7787 | 36.0744 |
| 8.999991 | 3.0049 | −5.9419 | 36.1003 |
| 8.999991 | 3.9860 | −6.1695 | 36.1363 |
| 8.999991 | 4.9509 | −6.4569 | 36.1818 |
| 8.999991 | 5.8996 | −6.7927 | 36.2350 |
| 8.999991 | 6.8325 | −7.1695 | 36.2947 |
| 8.999991 | 7.1780 | −7.3799 | 36.3280 |
| 8.999991 | 7.4624 | −7.6664 | 36.3734 |
| 8.999991 | 7.6685 | −8.0119 | 36.4281 |
| 8.999991 | 7.7661 | −8.4008 | 36.4897 |
| 8.999991 | 7.7573 | −9.2353 | 36.6219 |
| 8.999991 | 7.6345 | −10.0617 | 36.7528 |
| 8.999991 | 7.4303 | −10.8724 | 36.8812 |
| 8.999991 | 7.1540 | −11.6618 | 37.0062 |
| 8.999991 | 6.9796 | −11.9297 | 37.0487 |
| 8.999991 | 6.7253 | −12.1258 | 37.0797 |
| 8.999991 | 6.4279 | −12.2512 | 37.0996 |
| 8.999991 | 6.1091 | −12.3007 | 37.1074 |
| 8.999991 | 5.0912 | −12.2611 | 37.1011 |
| 8.999991 | 4.0736 | −12.2152 | 37.0939 |
| 8.999991 | 3.0556 | −12.1780 | 37.0880 |
| 8.999991 | 2.0372 | −12.1531 | 37.0840 |
| 8.999991 | 1.0188 | −12.1406 | 37.0821 |
| 8.999991 | 0.0000 | −12.1380 | 37.0816 |

-continued

| Theta | X | Y | Z |
|---|---|---|---|
| Sect 29 | | | |
| 9.333324 | 0.0000 | −6.3192 | 37.5229 |
| 9.333324 | 1.0658 | −6.3384 | 37.5260 |
| 9.333324 | 2.1292 | −6.4006 | 37.5362 |
| 9.333324 | 3.1887 | −6.5127 | 37.5547 |
| 9.333324 | 4.2418 | −6.6728 | 37.5810 |
| 9.333324 | 5.2862 | −6.8810 | 37.6152 |
| 9.333324 | 6.3210 | −7.1324 | 37.6565 |
| 9.333324 | 7.3453 | −7.4223 | 37.7042 |
| 9.333324 | 7.6571 | −7.5805 | 37.7302 |
| 9.333324 | 7.9035 | −7.8273 | 37.7707 |
| 9.333324 | 8.0573 | −8.1383 | 37.8218 |
| 9.333324 | 8.0911 | −8.4826 | 37.8784 |
| 9.333324 | 7.9752 | −9.3094 | 38.0143 |
| 9.333324 | 7.8030 | −10.1268 | 38.1487 |
| 9.333324 | 7.5915 | −10.9352 | 38.2815 |
| 9.333324 | 7.3450 | −11.7339 | 38.4128 |
| 9.333324 | 7.1943 | −11.9955 | 38.4558 |
| 9.333324 | 6.9580 | −12.1857 | 38.4870 |
| 9.333324 | 6.6732 | −12.2954 | 38.5051 |
| 9.333324 | 6.3689 | −12.3190 | 38.5090 |
| 9.333324 | 5.3114 | −12.1985 | 38.4891 |
| 9.333324 | 4.2525 | −12.0915 | 38.4716 |
| 9.333324 | 3.1913 | −12.0081 | 38.4578 |
| 9.333324 | 2.1285 | −11.9504 | 38.4484 |
| 9.333324 | 1.0645 | −11.9181 | 38.4431 |
| 9.333324 | 0.0000 | −11.9087 | 38.4415 |
| Sect 30 | | | |
| 9.666657 | 0.0000 | −6.5604 | 38.9294 |
| 9.666657 | 0.9709 | −6.5742 | 38.9317 |
| 9.666657 | 1.9404 | −6.6156 | 38.9388 |
| 9.666657 | 2.9083 | −6.6868 | 38.9509 |
| 9.666657 | 3.8735 | −6.7875 | 38.9680 |
| 9.666657 | 4.8353 | −6.9169 | 38.9901 |
| 9.666657 | 5.7924 | −7.0761 | 39.0172 |
| 9.666657 | 6.7444 | −7.2627 | 39.0490 |
| 9.666657 | 7.6906 | −7.4764 | 39.0854 |
| 9.666657 | 7.9809 | −7.6091 | 39.1080 |
| 9.666657 | 8.1998 | −7.8378 | 39.1470 |
| 9.666657 | 8.3166 | −8.1310 | 39.1969 |
| 9.666657 | 8.3101 | −8.4458 | 39.2505 |
| 9.666657 | 8.1164 | −9.2612 | 39.3894 |
| 9.666657 | 7.9088 | −10.0733 | 39.5277 |
| 9.666657 | 7.6913 | −10.8829 | 39.6656 |
| 9.666657 | 7.4652 | −11.6902 | 39.8032 |
| 9.666657 | 7.3312 | −11.9508 | 39.8475 |
| 9.666657 | 7.1081 | −12.1432 | 39.8803 |
| 9.666657 | 6.8302 | −12.2456 | 39.8977 |
| 9.666657 | 6.5337 | −12.2464 | 39.8979 |
| 9.666657 | 5.6095 | −12.0810 | 39.8697 |
| 9.666657 | 4.6813 | −11.9386 | 39.8455 |
| 9.666657 | 3.7496 | −11.8213 | 39.8255 |
| 9.666657 | 2.8148 | −11.7308 | 39.8101 |
| 9.666657 | 1.8777 | −11.6668 | 39.7992 |
| 9.666657 | 0.9392 | −11.6292 | 39.7928 |
| 9.666657 | 0.0000 | −11.6170 | 39.7907 |
| Sect 31 | | | |
| 9.999990 | 0.0000 | −6.4767 | 40.2842 |
| 9.999990 | 0.9841 | −6.4905 | 40.2866 |
| 9.999990 | 1.9664 | −6.5309 | 40.2938 |
| 9.999990 | 2.9474 | −6.5990 | 40.3057 |
| 9.999990 | 3.9262 | −6.6937 | 40.3225 |
| 9.999990 | 4.9020 | −6.8151 | 40.3439 |
| 9.999990 | 5.8739 | −6.9640 | 40.3701 |
| 9.999990 | 6.8413 | −7.1388 | 40.4009 |
| 9.999990 | 7.8033 | −7.3408 | 40.4366 |
| 9.999990 | 8.0861 | −7.4667 | 40.4588 |
| 9.999990 | 8.2955 | −7.6914 | 40.4984 |
| 9.999990 | 8.3995 | −7.9786 | 40.5490 |
| 9.999990 | 8.3805 | −8.2837 | 40.6028 |
| 9.999990 | 8.1603 | −9.0929 | 40.7455 |
| 9.999990 | 7.9402 | −9.9021 | 40.8882 |
| 9.999990 | 7.7200 | −10.7113 | 41.0309 |
| 9.999990 | 7.4998 | −11.5206 | 41.1736 |
| 9.999990 | 7.3708 | −11.7820 | 41.2197 |

-continued

| Theta | X | Y | Z |
|---|---|---|---|
| 9.999990 | 7.1522 | −11.9765 | 41.2540 |
| 9.999990 | 6.8761 | −12.0770 | 41.2717 |
| 9.999990 | 6.5811 | −12.0686 | 41.2702 |
| 9.999990 | 5.6530 | −11.8794 | 41.2368 |
| 9.999990 | 4.7193 | −11.7194 | 41.2086 |
| 9.999990 | 3.7811 | −11.5876 | 41.1854 |
| 9.999990 | 2.8391 | −11.4852 | 41.1673 |
| 9.999990 | 1.8944 | −11.4120 | 41.1544 |
| 9.999990 | 0.9479 | −11.3681 | 41.1467 |
| 9.999990 | 0.0000 | −11.3534 | 41.1441 |

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A transition duct comprising:

an inlet ring;

an aft frame; and, a panel assembly extending therebetween and connecting the inlet ring to the aft frame, the panel assembly having an inlet end of generally circular cross section and a center and an outlet end of generally rectangular arc-like cross section, the panel assembly having an uncoated internal profile substantially in accordance with coordinates X, Y, and Z at an angle Θ, as set forth by Table 1, the X, Y, and Z values carried to three decimal places wherein the coordinates are relative to an origin at the center of the inlet end and taken at a sweep angle Θ that is measured from a first plane defined by the inlet end and increases toward a second plane defined by the outlet end, the planes intersecting at a line about which the angle Θ is measured, and wherein X, Y, and Z are coordinates defining the panel assembly profile at each angle Θ from said inlet end, with X, Y, and Z having an origin at the center of the inlet end, and a z-axis extending perpendicular from the first plane.

2. The transition duct of claim 1, wherein the panel assembly comprises a first panel and a second panel, the first panel and second panel joined together along a plurality of generally axial seams.

3. The transition duct of claim 1, wherein the internal profile for the panel assembly can vary up to 0.125 inches due to manufacturing tolerances.

4. The transition duct of claim 1, wherein the transition duct panel assembly has a two-layer air plasma sprayed coating comprising a bond coating applied along the internal profile of the panel assembly and a top coating applied over the bond coating.

5. The transition duct of claim 4, wherein the two-layer coating applied along the internal profile has a combined thickness of at least 0.019 inches.

6. The transition duct of claim 1 further comprising a plurality of cooling holes in the panel assembly.

7. The transition duct of claim 1, wherein the panel assembly is fabricated from a high-temperature nicked-base alloy.

8. A transition duct comprising:

an inlet ring;

an aft frame;

a panel assembly extending between the inlet ring and the aft frame and connected thereto, the panel assembly having an inlet end generally circular in cross section having a center and an outlet end of generally rectangular arc-like cross section, the panel assembly having an uncoated internal profile with an envelope of +/− 0.250 inches in a direction normal to any surface formed from coordinate values X, Y, and Z at an angle Θ, as set forth in Table 1, the X, Y, and Z values carried only to three decimal places wherein the coordinates are relative to an origin at the center of the inlet end and taken at the sweep angle Θ, which is measured from a first plane defined by the inlet end and increases toward a second plane defined by the outlet end, the planes intersecting at a line about which the angle Θ is measured, and wherein X, Y, and Z are coordinates defining the panel assembly profile at each angle Θ from the inlet end, with X, Y, and Z having an origin at the center of the inlet end, and a z-axis extending perpendicular from the first plane.

9. The transition duct of claim 8, wherein the panel assembly comprises a first panel and a second panel, the first panel and the second panel joined together along a plurality of generally axial seams.

10. The transition duct of claim 9 further comprising a plurality of cooling holes in the first panel.

11. The transition duct of claim 9 further comprising a plurality of cooling holes in the second panel.

12. The transition duct of claim 8, wherein the transition duct panel assembly has a multi-layer coating comprising at least a bond coating applied along the internal profile of the panel assembly and a top coating applied over the bond coating.

13. The transition duct of claim 12, wherein the two-layer coating applied along the internal profile has a thickness of at least 0.019 inches.

14. A gas turbine transition duct panel assembly comprising a first panel and second panel fixed together along a plurality of seams, the panel assembly having an inlet end and an outlet end with a first plane established at the inlet end and a second plane established at the outlet end, the panel assembly having an uncoated internal profile within an envelope of +/− 0.250 inches in a direction normal to any surface formed from coordinate values X, Y, and Z at an angle Θ, as set forth in Table 1, the X, Y, and Z values carried only to three decimal places wherein the coordinates are relative to an origin at the center of the inlet end and taken at the sweep angle Θ, which is measured from the first plane and increases toward a second plane defined by the outlet end, the planes intersecting at a line about which angle Θ is measured, and wherein X, Y, and Z are coordinates defining the panel assembly profile at each angle Θ from the inlet end, with X, Y, and Z having an origin at the center of the inlet end, and a z-axis extending perpendicular from the first plane.

15. The panel assembly of claim 14 further comprising a two-layer air plasma sprayed coating comprising a bond coating applied along the internal profile of the panel assembly and a top coating applied over the bond coating.

16. The panel assembly of claim 15, wherein the two-layer coating applied along the internal profile of at least 0.019 inches thick.

17. The panel assembly of claim 14 further comprising a plurality of cooling holes in the first panel.

18. The panel assembly of claim 17 further comprising a plurality of cooling holes in the second panel.

* * * * *